Nov. 30, 1965     J. J. HICKEY     3,221,184
HIGH VOLTAGE RAMP WAVEFORM GENERATOR UTILIZING CAPACITOR
DISCHARGE THROUGH A CONSTANT CURRENT PENTODE
Filed Dec. 26, 1962
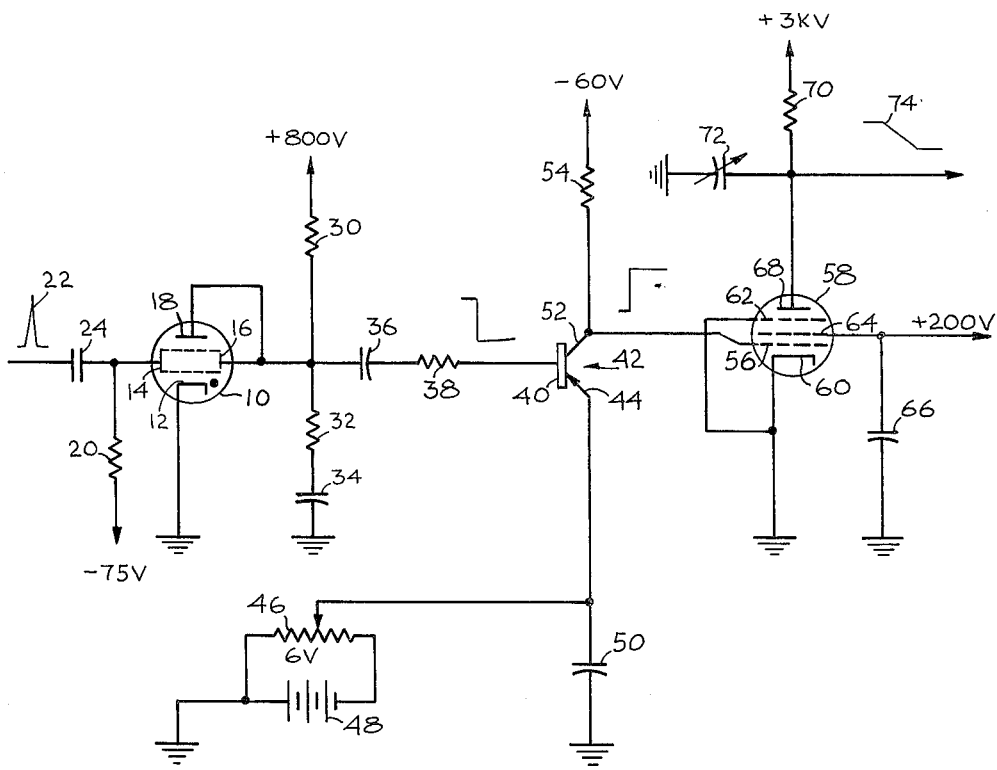
JOHN J. HICKEY
INVENTOR.
BY Jerry G. Dinardo
AGENT United States Patent Office 3,221,184
Patented Nov. 30, 1965

3,221,184
HIGH VOLTAGE RAMP WAVEFORM GENERATOR UTILIZING CAPACITOR DISCHARGE THROUGH A CONSTANT CURRENT PENTODE
John J. Hickey, Hawthorne, Calif., assignor, by mesne assignments, to TRW Inc., a corporation of Ohio
Filed Dec. 26, 1962, Ser. No. 246,996
2 Claims. (Cl. 307—88.5)

This invention relates to sweep circuits, and more particularly to improvements in circuits capable of generating high voltage ramp waveforms of high linearity and of predetermined and variable time durations and slope.

In certain applications which utilize image tubes and cathode ray tubes of low electrostatic deflection sensitivity, such as high speed electronic cameras and oscillographs, linear ramp or sawtooth waveforms are required which have excursions of several kilovolts. While there are known circuits for producing low voltage ramps, of the order of hundreds of volts, these circuits can not be used to generate ramp voltages having excursions of 2000 or more volts. Low voltage ramp waveforms produced by these circuits can not be readily amplified without introducing a high degree of non-linearity.

Other prior art circuits are known which can generate high voltage ramp waveforms of the order of several kilovolts. However, those circuits require the use of relatively high power beam tubes. Further, some of these circuits require a precisely shaped and rather complex grid driving waveform, while other circuits require the application of two independently controlled input waveforms on separate grid elements of the beam power tube.

Accordingly, an object of this invention is to provide a simplified, variable slope, ramp voltage generator of low power consumption, capable of providing linear sweep voltages of the order of several kilovolts.

A further object is to provide a low cost, compact, high voltage ramp waveform generator for use in electrostatic deflection circuits.

In accordance with this invention, a linear ramp voltage is generated by discharging a capacitor at a constant rate through a pentode tube in shunt therewith, while operating the anode of the pentode tube at voltages considerably in excess of its normal rated voltage. By the judicious selection of a pentode tube having superior constant current characteristics and by applying a fixed voltage to the screen grid and a step voltage to the control grid of such magnitudes that the plate current remains substantially constant over a wide range of anode voltage, the capacitor is made to discharge at a constant rate, thereby providing a high voltage linear ramp. Means are provided to selectively change the control grid voltage on the pentode tube to change the level of constant plate current and thereby change the slope of the ramp voltage. An increase in the negative control grid bias will cause the plate current to drop to a lower level and thereby decrease the slope of the ramp voltage.

The single figure of the drawing is a schematic circuit illustrating an embodiment of the linear ramp voltage generator of the invention. A negative current step generator includes a thyratron 10 having a grounded cathode 12, a control electrode 14, a primary anode 16, and a secondary anode 18. The control electrode 14 is connected to a negative bias source of 75 volts through a bias resistor 20. The control electrode is adapted to receive a positive trigger pulse 22 through a coupling capacitor 24.

In this embodiment the secondary anode 18 is connected to the primary anode 16 and the thyratron 10 is operated as a gas triode.

The primary anode 16 is connected through a charging resistor 30 to a positive potential of 800 volts. The primary anode 16 is also connected through a resistor 32 and capacitor 34 to ground. The primary anode 16 is connected through a network including a capacitor 36 and resistor 38 to the base 40 of a p-n-p transistor 42.

The emitter 44 of the transistor 42 receives a negative bias from a potentiometer 46 connected across a D.C. voltage source 48. A by-pass capacitor 50 is connected between the emitter 44 and ground. The collector 52 is connected to a negative potential of 60 volts through a current limiting resistor 54.

The collector 52 of the transistor 42 is connected to the control grid 56 of a ramp generator pentode tube 58, the cathode 60 and suppressor grid 62 thereof being grounded. The screen grid 64 is connected to a positive potential of 200 volts and is by-passed to ground through a capacitor 66. The anode 68 is connected through a charging resistor 70 to a positive potential of 3000 volts. Connected in shunt with the ramp generator tube 58 between the anode 68 and cathode 60 is a discharge capacitor 72 which can be varied for purposes described below.

The operation of the ramp generator circuit will now be described. In the absence of a trigger pulse 22 on the control electrode 14 of the thyratron 10, the latter is biased to a nonconducting condition. Accordingly, capacitors 34 and 36 are fully charged to the primary anode 16 potential of 800 volts. The transistor 42 is also nonconducting, the capacitor 36 serving to block current flow in the emitter 44-base 40 circuit. Due to the absence of current flow in the emitter 44-base 40 circuit, no current flows in the emitter 44-collector 52 circuit. Thus, the control grid 56 of the ramp generator tube 58 receives a high bias potential of 60 volts negative which is sufficient to keep the tube 58 nonconducting. Consequently, the discharge capacitor 72 is fully charged to the supply potential of 3000 volts.

When a positive trigger pulse 22 of, say 150 volts, is coupled to the control electrode 14 through the capacitor 24, it raises the potential of the control electrode above cutoff, thereby causing the thyratron 10 to conduct. The conducting thyratron 10 provides a discharge path for the capacitors 34 and 36. The capacitor 34 supplies a sufficiently large discharge current to maintain the thyratron 10 conducting for a sufficiently long time to enable the relatively smaller discharge current from the capacitor 36 to flow through the circuit comprising the primary anode 16, cathode 12, capacitor 50, the emitter 44-base 40 circuit of the transistor 42 and resistor 38. The discharge current through the emitter 44-base 40 circuit is a negative step current of about 1 ma. whose time constant is long relative to the ramp duration.

The flow of current in the emitter 44-base 40 circuit of the transistor 42 causes current to flow from the emitter 44 to the collector 52. When the transistor 42 conducts it switches the negative bias on the control grid 56 of the ramp generator tube 58 to a reduced value that is equal to the sum of the reference voltage as determined by the setting of the potentiometer 46, plus a small voltage drop of less than 1 volt across the transistor 42. The reduced bias on the control grid 56 causes the ramp generator tube 58 to conduct, thereby providing a current discharge path for the capacitor 72.

In accordance with the invention, the ramp generator tube 58 is selected as one having extremely flat constant current characteristics. That is, with a fixed control grid bias as determined by the setting of the potentiometer 46 and the voltage drop across the transistor 42, and with a fixed screen grid voltage of about 200 volts, the plate current through the tube 58 remains substantially constant over a wide range of high anode 68 voltage. A preferred form of ramp generator tube 58 is a miniature type sharp cutoff pentode, such as a type 6AU6.

While this type of tube is normally rated for continuous operation at a plate voltage of about 300 to 350 volts, it has been found to have excellent constant current characteristics when operated at 3 kilovolts, which is an order of magnitude in excess of its rated value. Accordingly, as the capacitor 72 discharges through the tube 58, the voltage on the capacitor 72 and thus the anode 68 voltage drops as a function of time. Due to the constant current characteristics of the tube 58, the discharge current will remain substantially constant despite the decreasing anode 68 voltage, with the result that the anode 68 and capacitor 72 voltage falls linearly as a function of time, giving rise to a negative going linear ramp voltage waveform 74.

The slope of the ramp voltage or the rate at which it decreases is determined by the plate current in the tube 58 and the capacitance value of capacitor 72, according to the expression $$\frac{dv}{dt} = \frac{1}{C}\frac{dq}{dt}$$

where $$\frac{dv}{dt}$$

is the rate of change of the voltage on capacitor 72, C is the capacitance value of capacitor 72, and $$\frac{dq}{dt}$$

is the discharge current which is substantially constant. By moving the movable tap on the potentiometer 46 in a direction to increase the reference potential more negatively, the plate current and the slope of the ramp voltage will be reduced. Conversely, by reducing the bias, the slope of the ramp voltage will be increased.

The maximum slope of the ramp voltage for any given constant discharge current is limited by the interelectrode capacitances of the discharge tube. The 6AU6 and other miniature pentodes of this type have relatively lower interelectrode capacitances than the high power pentodes and beam power tubes conventionally used in similar circuits. Therefore, for a given discharge current the 6AU6 and other miniature pentodes of this type are capable of generating ramp voltages of steeper slope and therefore higher speed than the higher power types mentioned above.

Another advantage of using miniature tubes of the type described above is their relatively low grid voltage switching requirements. This permits the use of low power high speed transistors for rapidly switching the control grid voltage level of the discharge tube.

The ramp generator circuit of the invention has been operated successfully with the circuit values listed below. It has been found for the type 6AU6 that the plate current is constant to within 5% over the range of anode voltages from 3 kv. to 1 kv. By altering the control grid 50 bias voltage between the range of −1 to −7 volts, in conjunction with the capacitance value of capacitor 72, 2 kilovolt linear ramp voltages have been generated which have durations from 1 microsecond up to several milliseconds.

| | |
|---|---|
| Thyratron 10 | Type 2D21. |
| Resistor 20 | 10 kilohms. |
| Capacitor 24 | 100 picofarads. |
| Resistor 30 | 1 megohm. |
| Resistor 32 | 5.1 kilohms. |
| Capacitor 34 | 0.1 microfarad. |
| Capacitor 36 | 0.01 microfarad. |
| Resistor 38 | 800 kilohms. |
| Transistor 42 | 2N721. |
| Voltage source 48 | 6 volt battery. |
| Capacitor 50 | 0.5 microfarad. |
| Resistor 54 | 1 megohm. |
| Tube 58 | 6AU6. |
| Capacitor 66 | 1.0 microfarad. |
| Resistor 70 | 100 megohms. |
| Capacitor 72 | 10 to 1000 picofarads. |
| Potentiometer 46 | 100 ohms. |

It will now be seen that the ramp generator of the invention is one of great simplicity and compactness. It permits the use of low power consuming, miniature pentodes instead of the high power, more bulky beam power tubes. The circuit requirements are greatly simplified since it requires a single, easily generated step voltage and has no need for complicated feedback arrangements that are sometimes used to achieve good linearity.

The embodiments of the invention in which an exclusive property or privilege is claimed are defined as follows:

1. A sweep generator circuit comprising:
   an electron discharge tube including a cathode, a control grid, a screen grid, and an anode;
   means connected between said anode and said cathode for supplying an initial positive potential to said anode relative to said cathode that is an order of magnitude greater than the normal rated value;
   means connected between said screen grid and said cathode for supplying an initial positive potential to said screen grid relative to said cathode, said means constituting the sole potential supply for said screen grid;
   means for applying a bias to said control grid to render said discharge tube initially nonconducting;
   a capacitor connected in shunt between said anode and said cathode;
   a transistor including a base, a collector, and an emitter;
   a relatively negative voltage supply connected to said collector;
   a relatively low voltage supply connected to said emitter;
   means connecting said collector to the control grid of said electron discharge tube;
   said transistor being normally nonconducting, whereby the control grid of said electron discharge tube is normally below cutoff potential;
   means for producing a negative current step of sufficient magnitude to render said transistor conducting;
   and means for coupling said negative current step to the base of said transistor thereby to render the emitter-collector circuit thereof conducting, whereupon the control grid voltage of said electron discharge tube is rapidly raised above cutoff to render said tube conducting and to cause said capacitor to discharge through said tube;
   said tube being characterized in that its plate current is constant within about 5% over a range of anode voltage between 3000 and 1000 volts under fixed control grid and screen grid voltage, whereby the voltage on said capacitor discharges at a constant rate to produce a linear ramp voltage thereacross.

2. The invention according to claim 1, wherein the negative voltage supply connected to the emitter of said transistor is variable in magnitude to alter the speed of the ramp voltage.

References Cited by the Examiner
UNITED STATES PATENTS

| | | | |
|---|---|---|---|
| 2,492,018 | 12/1949 | Sunstein | 328—183 X |
| 2,503,320 | 4/1950 | Boothroyd | 328—128 X |
| 3,164,778 | 1/1965 | Clark et al. | 328—183 |

DAVID J. GALVIN, *Primary Examiner.*

ARTHUR GAUSS, *Examiner.*